Feb. 25, 1930.　　　　G. C. KELLEY　　　　1,748,295
APPARATUS FOR HEATING OIL
Filed April 29, 1924
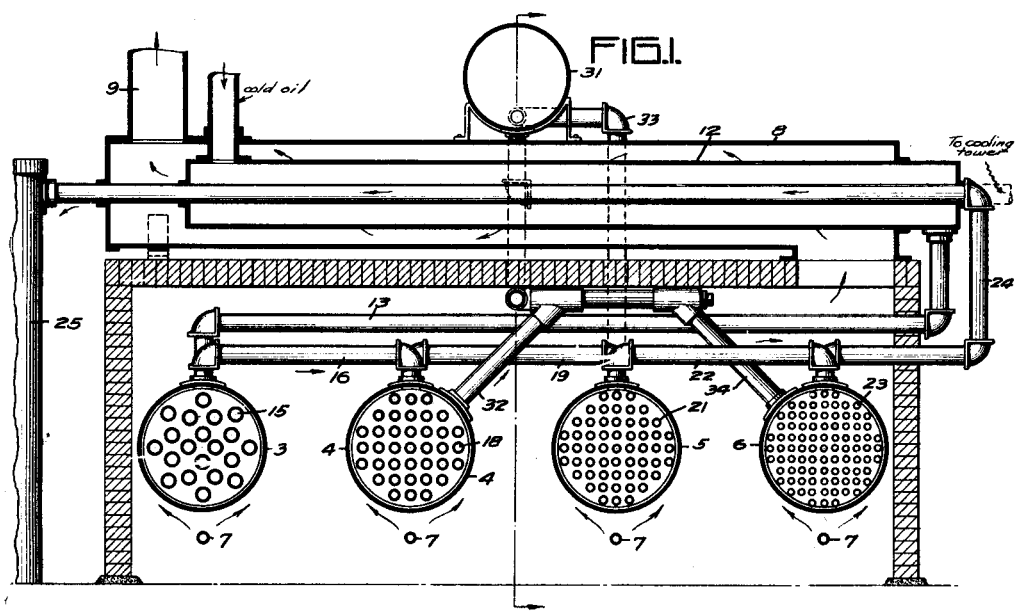
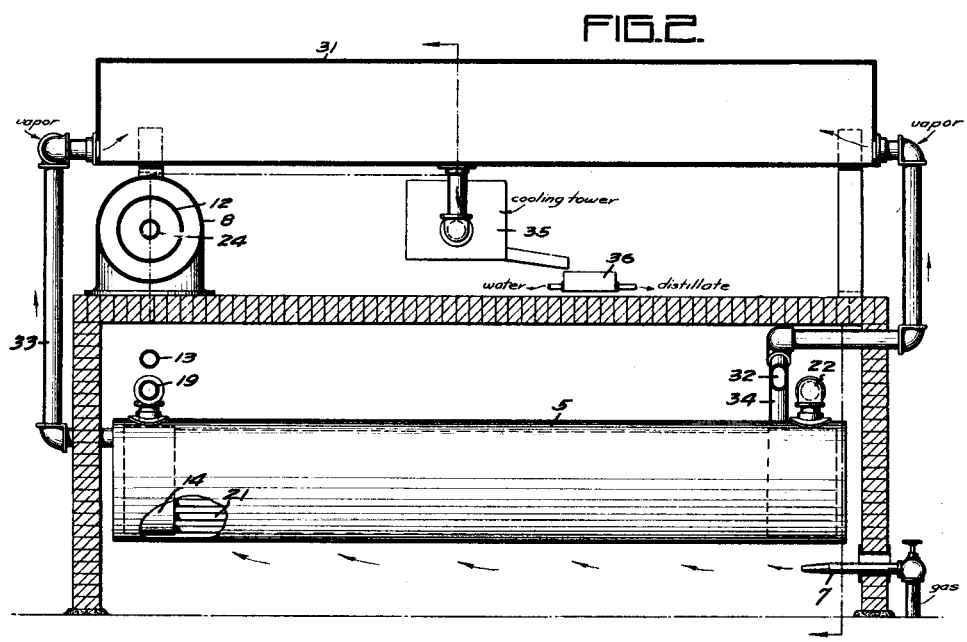
INVENTOR
George C. Kelley
by White Prost & Evans
his ATTORNEYS Patented Feb. 25, 1930

1,748,295

UNITED STATES PATENT OFFICE

GEORGE C. KELLEY, OF TAFT, CALIFORNIA

APPARATUS FOR HEATING OIL

Application filed April 29, 1924. Serial No. 709,888.

The invention relates to an apparatus for heating oil, generally as it comes from the oil well, to facilitate the separation of water from the oil.

A large proportion of the oil taken from oil wells carries water either in suspension or in the form of an emulsion and it is essential that this water be removed. This has been accomplished in the past by flowing the oil into a large tank and heating the mass of oil in the tank to reduce the viscosity of the oil to facilitate the separation of water. The heating of the large mass of oil, however, causes agitation and ebullition of the oil with the result that the percentage of emulsion is increased.

An object of my invention is to provide an apparatus for so heating the oil from the wells or from storage tanks that the emulsion in the oil is reduced or removed.

Another object of the invention is to provide an oil heating apparatus in which the oil is gradually and uniformly heated so that the contained water is removed without violent agitation of the oil.

Another object of the invention is to provide an oil heating apparatus in which the oil is kept continuously moving in a confined passage in such manner that emulsification of the oil does not occur.

The invention possesses other advantageous features, some of which with the foregoing, will be set forth at length in the following description, where I shall outline in full, that form of my invention which I have selected for illustration in the drawings accompanying and forming part of the present specification. In said drawings I have shown one form of apparatus embodying my invention, but it is to be understood that I do not limit myself to such form, since the invention, as set forth in the claims, may be embodied in a plurality of forms.

Referring to said drawings:—

Figure 1 is a vertical section through one form of apparatus embodying my invention.

Figure 2 is a longitudinal vertical section taken on the line as indicated on Figure 1.

The apparatus shown in the drawings comprises a furnace suitably formed of brick work in which there are arranged a plurality of drums through which the oil to be treated passes successively. In the present instance there are four drums 3, 4, 5 and 6 and associated with each drum is an oil burner 7 for producing the necessary temperature within the furnace. The furnace is provided with an elongated flue 8, preferably horizontally disposed, through which the gases of combustion pass to the stack 9. Disposed in the flue 8 is an oil heater pipe 12 through which the oil to be heated passes on its way to the furnace so that the oil is pre-heated by the gases of combustion before it enters the furnace. The oil entering the furnace passes from the heater pipe 12 through the pipe 13 into one end of the drum 3. Each of the drums is provided at opposite ends with headers 14 and the headers are connected together by a plurality of pipes or tubes so that the oil flows in one direction through the tubes from one header to the other. Fig. 2 of the drawing shows the manner in which the headers 14 are mounted within the drum, this figure showing the drum 5 having the tubes 21 passing between and connecting the headers 14. The tubes are connected to the headers in parallel, and the drums which contain water are heated by the burners 7.

As clearly shown in Fig. 1 the tubes 15, 18, 21, 23, of the drums 3, 4, 5, 6 respectively, are of gradually decreasing diameter, that is to say, tubes 18 are smaller than the tubes 15, tubes 21 smaller than tubes 18, and tubes 23 smaller than tubes 21, but there is a larger number of tubes in each successive drum so that the combined cross-sectional area for the full set of tubes of each drum is substantially equal to the combined cross-sectional area of the full set of tubes of each of the other drums. The oil, after passing through the tubes 15 of drum 3, flows from the header at the exit end of the drum 3, through the pipe 16 to the inlet header of the drum 4, thence through the tubes 18 of drum 4, from which it flows through the pipe 19 to the drum 5, passing through the tubes 21 of said drum 5, and thence through pipe 22 to the inlet header and tubes 23 of drum 6. In its passage through the apparatus, the oil is subjected to a gradually increasing temperature, receiving a preheating in the pipe 12, then being subjected to the heat of the water in drums 3 and 4 which water is preferably maintained at about 138° F. and 190° F. in said drums 3 and 4 respectively. The drums 5 and 6 are heated preferably to about 230° F. and 260° F., respectively, the burners 7 being controlled to maintain the desired heat in each respective drum; consequently steam will be generated for heating the oil in the drums 5 and 6. The diameters of the pipes are so proportioned and the oil flow so controlled that each of the tubes will be entirely filled with oil, thereby preventing ebullition of the oil in its passage through the apparatus.

While the velocity of the oil flow is substantially the same in each drum the heating effect is increased in each successive drum because of the greater heating surface presented by the smaller tubes.

From the rear header of the drum 6, the hot oil passes through the discharge pipe 24 which preferably extends through the oil inlet pipe 12 so that the incoming oil is heated by the hot discharging oil and so that the discharging oil is cooled. By arranging for this interchange of heat between the discharging oil and the incoming oil, a large saving in fuel is accomplished, since substantially all of the heat of the discharging oil is transferred to the inflowing oil. The discharging oil passes from the pipe 24 into the settling tank 25 whence it is withdrawn for sale or refining or further use.

Due to the temperatures produced in the drums 4, 5 and 6, water vapor will be liberated from the oil in the drums 5 and 6 and the vapors of the lighter constituents of the oil will be liberated in the drums 4, 5 and 6. Provision is made for collecting these vapors and condensing them and separating the water from the oil product. Arranged above the furnace is a collecting drum 31 which is connected to the rear header of the drum 4 by the pipe 32, to the front header of the drum 5 by the pipe 33 and to the rear header of the drum 6 by the pipe 34, so that vapors produced in the drums 4, 5 and 6 are conducted to the drum 31. From the drum 31 the vapors pass to the cooling tower 35, shown diagrammatically in Figure 2, wherein the vapors are condensed and from the cooling tower the condensed liquids flow to a segregating device 36 in which the water is separated from the oil distillate.

The oil, in passing through the drums, is kept moving continuously in very small streams and is gradually and uniformly heated, so that there is no ebullition or agitation of the oil which would increase the proportion of the emulsion in the oil. The oil is flowed slowly through the tubes so that it is raised to the temperature of the surrounding medium before it discharges from the tubes. The temperature is sufficient to free the water held in the emulsion and, at the increased temperature, the viscosity of the oil is greatly reduced, so that any water which is not evaporated from the oil readily separates out by gravity in the settling tanks 25. Ordinarily, however, the oil which is discharged into the settling tank is the finished product and contains substantially no water.

I claim:

1. In an apparatus for treating oil, the combination of a furnace, a plurality of drums in said furnace adapted to be heated respectively to successively higher temperatures, a plurality of conduits of small diameter functioning as described in each drum through which the oil passes, the conduits in each of the successive drums being of smaller diameter than the conduits of the preceding drum throughout the entire apparatus whereby all of the conduits are completely filled with oil during the effective heat treatment and ebullition or foaming of the oil is prevented during such treatment and means for passing the oil successively through the drums.

2. In an apparatus for treating oil, the combination of a series of groups of conduits functioning as described through which the oil passes, each of the successive groups of conduits being of smaller diameter than the preceding series of conduits throughout the entire apparatus whereby the conduits are completely filled with oil during the entire effective heat treatment and means for subjecting the successive groups of conduits to higher temperatures.

3. In an apparatus for treating oil, the combination of a plurality of groups of conduits connected in series functioning as described, through which the oil passes in a continuous confined column, there being a larger number of conduits in each successive group and the diameters of the conduits being smaller in each successive group throughout the entire apparatus and means for subjecting the successive groups to successively higher temperatures.

4. In an apparatus for treating oil, the combination of a plurality of groups of conduits functioning as described, the conduits in each group being arranged in parallel and the groups being connected in series so that oil flows successively through the successive groups, each successive group comprising a greater number of conduits than the preceding group and the conduits in each group being of smaller diameter than the conduits in the preceding group throughout the entire apparatus, and means for subjecting the successive groups to successively higher temperatures.

5. In an apparatus for treating oil in a system wherein during the effective heat treatment the flowing oil is confined in conduits which are then completely filled with said oil, the combination of a furnace, a plurality of drums in said furnace, each adapted to contain a heat absorbing medium, means connecting said drums together in series and a plurality of conduits functioning as described through which the oil passes arranged in each drum, the conduits in the successive drums in the series throughout the entire apparatus being of smaller diameter.

6. In an apparatus for treating oil in a system wherein during the effective heat treatment the flowing oil is confined in conduits which are then completely filled with said oil, the combination of a plurality of drums each adapted to contain a heat absorbing medium, a plurality of conduits functioning as described through which the oil passes arranged in each drum, means connecting the drums together to cause the oil to flow through the conduits in the successive drums successively, the conduits in the successive drums throughout the entire apparatus being of greater number and smaller diameter and means for heating the successive drums to successively higher temperatures.

7. An apparatus for heating oil comprising a furnace, a hot water drum in said furnace, a plurality of conduits in said drum through which the oil flows, a steam drum in said furnace and a plurality of smaller conduits in the steam drum through which the oil heated in the hot water drum flows.

8. An apparatus for heating oil comprising a furnace, a flue for the gases of combustion from the furnace, a plurality of drums in said furnace in which the oil is heated, a cold oil feed pipe extending longitudinally through said flue and a hot oil discharge pipe extending longitudinally through said cold oil feed pipe.

9. In an apparatus for treating oil in a system wherein during the effective heat treatment, the flowing oil is confined in conduits which are then completely filled with said oil, the combination of a plurality of drums each adapted to contain a heat absorbing medium, a header in each end of each drum, a plurality of tubes horizontally arranged in parallel connecting the headers of each drum together, conduits connecting the headers together in series so that the oil passes successively through the drums and entirely fills said tubes, the temperature of the medium being sufficient to vaporize the lighter constituents of the oil, a drum in which the vapors are collected and means for condensing the vapors.

10. In an apparatus for treating oil in a system wherein during the effective heat treatment, the flowing oil is confined in conduits which are then completely filled with said oil, the combination of a plurality of drums through which the oil is passed in a plurality of confined parallel small streams, means for heating the successive drums to successively higher temperatures whereby water and oil vapors are released in the drums, means for conducting the vapors from the drums and means for condensing the vapors.

11. In an apparatus for treating oil in a system wherein during the effective heat treatment, the flowing oil is confined in conduits which are then completely filled with said oil, the combination of a plurality of drums each adapted to contain a heat absorbing medium, a header in each end of each drum, a plurality of tubes connecting the headers of each drum together, the drums being connected together in series and the tubes in the successive drums being greater in number and smaller in diameter, means for heating the successive drums to successively higher temperatures, such temperatures being sufficient to vaporize water and the lighter constituents of the oil and conduits for conveying the vapors from the drums.

12. In an apparatus for heating oil, a plurality of drums each containing a group of conduits through which the oil to be treated is passed, means connecting said drums in series, there being a greater number of conduits in each successive drum and the diameter of the conduits of each drum being smaller than the diameter of the conduits of the preceding drums, and the number and diameter of the conduits of each drum being such that the combined effective cross-sectional area of the conduits in each group is substantially equal.

13. In an apparatus for heating oil, a plurality of drums each containing a group of conduits through which the oil to be treated is passed, means connecting said drums in series, there being a greater number of conduits in each successive drum and the diameter of the conduits of each drum being smaller than the diameter of the conduits of the preceding drums, said conduits being horizontally arranged, and the number and diameter of the conduits of each drum being such that the combined effective cross-sectional area of the conduits in each group is substantially equal whereby each of said conduits will be completely filled with a confined column of oil.

14. In an apparatus for heating oil, a plurality of drums each containing a group of conduits through which the oil to be treated is passed, means connecting said drums in series, there being a greater number of conduits in each successive drum and the diameter of the conduits of each drum being smaller than the diameter of the conduits of the preceding drums, said conduits being horizontally arranged, and the number and diameter of the conduits of each drum being such that the combined effective cross-sectional area of the conduits in each group is substantially equal, whereby each of said conduits will be completely filled with a confined column of oil, and means for subjecting each group of conduits to a higher temperature than the preceding group.

15. In an apparatus for treating oil, the combination which comprises a furnace, an exit flue for the furnace gases, an oil circuit including an inlet pipe for the cold oil and an outlet pipe for the hot oil, said inlet and outlet pipes being arranged within said exit flue as a heat exchanger for effecting heat exchange between the oil flowing through said inlet pipe and the oil flowing through said outlet pipe, said heat exchanger being subject, within said exit flue, to the heating action of the furnace gases passing through the exit flue.

16. In an apparatus for treating oil, the combination which comprises a furnace, a plurality of drums located in said furnace, said drums being closed against the admission of the heating gases of the furnace, a header in each end of each drum, a plurality of tubes horizontally arranged in parallel connecting the headers of each drum together, means for introducing and holding a body of water in each of said drums between the headers, connections interposed between the said drums to connect them in a series in which the oil passing through the successive drums is heated to successively higher temperatures, means for causing oil to pass through the tubes in the successive drums and in passing therethrough to fill entirely the tubes within each drum, an inlet for oil associated with the initial drum of the series of drums, an outlet for treated oil associated with the terminal drum of the series, and an exit flue connected to the furnace for leading the furnace gas from around the said drums to the atmosphere.

In testimony whereof, I have hereunto set my hand.

GEORGE C. KELLEY.